United States Patent
Barreto et al.

(10) Patent No.: US 8,087,766 B2
(45) Date of Patent: Jan. 3, 2012

(54) FAST-DRYING, SOLVENT-BASED INKJET COMPOSITION AND A METHOD AND SYSTEM FOR PRINTING SUCH INK

(75) Inventors: Marcos A. Barreto, Aguadilla, PR (US); Orlando Ruiz, Mayaguez, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/122,334

(22) PCT Filed: Oct. 6, 2008

(86) PCT No.: PCT/US2008/079001
§ 371 (c)(1),
(2), (4) Date: Apr. 1, 2011

(87) PCT Pub. No.: WO2010/042104
PCT Pub. Date: Apr. 15, 2010

(65) Prior Publication Data
US 2011/0181666 A1   Jul. 28, 2011

(51) Int. Cl.
*B41J 2/17* (2006.01)
(52) U.S. Cl. .............. 347/95; 347/41; 347/100
(58) Field of Classification Search .......... 347/20, 347/40–43, 56, 95–96, 100, 101; 106/31.6, 106/31.13, 31.27; 523/160, 161
See application file for complete search history.

(56) References Cited

U.S. PATENT DOCUMENTS

| | | | |
|---|---|---|---|
| 4,975,117 A | 12/1990 | Tabayashi et al. | |
| 5,006,172 A | 4/1991 | Chieng et al. | |
| 5,431,724 A | 7/1995 | Adamic et al. | |
| 5,641,346 A | 6/1997 | Mantell et al. | |
| 5,766,327 A | 6/1998 | Maze | |
| 5,902,390 A * | 5/1999 | Malhotra et al. | 106/31.58 |
| 6,145,979 A | 11/2000 | Caiger et al. | |
| 6,786,955 B2 | 9/2004 | Kabalnov | |
| 6,848,777 B2 | 2/2005 | Chen et al. | |
| 7,001,016 B2 | 2/2006 | Baxter et al. | |
| 7,081,158 B2 | 7/2006 | Sabys et al. | |
| 7,250,078 B2 | 7/2007 | Iijima et al. | |
| 7,304,095 B2 | 12/2007 | Masumi et al. | |
| 2002/0174800 A1 | 11/2002 | Moreland | |
| 2003/0188662 A1 | 10/2003 | Kabalnov | |
| 2007/0225400 A1 | 9/2007 | Schmid et al. | |
| 2008/0018676 A1 | 1/2008 | Soroker et al. | |

FOREIGN PATENT DOCUMENTS

| | | |
|---|---|---|
| JP | 2005350493 | 12/2005 |
| JP | 2007246791 | 9/2007 |
| JP | 2007326931 | 12/2007 |

OTHER PUBLICATIONS

International Search Report for Application No. PCT/US2008/079001 dated May 26, 2009 (11 pages).

\* cited by examiner

*Primary Examiner* — Juanita D Jackson

(57) ABSTRACT

Disclosed herein is a fast drying solvent-based inkjet ink composition for thermal inkjet printing. The ink composition includes at least 40 weight percent base solvent, a solvent-compatible colorant, not more than 25 weight percent propellant, a decap-controlling additive, from 0.5 weight % to 3.5 weight % of a binder resin and not more than 5 weight % water. The application also relates to the method and system for inkjet printing with the above-described ink.

17 Claims, 3 Drawing Sheets

FAST-DRYING, SOLVENT-BASED INKJET COMPOSITION AND A METHOD AND SYSTEM FOR PRINTING SUCH INK

BACKGROUND

The present disclosure relates generally to the problem of achieving fast drying of thermal inkjet ink on various substrates.

The adhesion of an ink film on a substrate depends, at least in part, on the interaction of the ink components with the substrate. In semi-porous and non-porous substrates the adhesion of the ink is significantly influenced by the properties of the media at the microscopic level. These properties include the surface energy of the substrate, roughness of the substrate, and porosity of the substrate. Poor adhesion of the ink to the substrate can be manifested when an ink can be easily removed or abrased by an object. On many occasions, the abradant or the abrasive object is represented by the media itself, but in other cases more abrasive objects can also be present.

Poor resistance to abrasion may be related to the adhesion of the ink film to the substrate. In general terms, if the ink is not adequately adhered to the substrate, then the ink is less resistant to abrasion. Thus, to improve the adhesion of the ink to the substrate, and consequently obtain improved resistance to abrasion, one might need to maximize the anchoring of the ink to the substrate. A way to improve anchoring of the ink to the substrate might include the use of corona discharge, among other treatments. This treatment applies a corona discharge, which results in the production of ozone, which is the same highly reactive species which causes chemical transformations (e.g., oxidation) of the substrate surface. With this treatment, the surface comes to contain chemical groups that can interact with the ink components (via Van der Waals, hydrogen-bonding interactions, etc.) and form a strong "bond" with the ink. See Tran et al., U.S. Patent Application Publication No. 200410055698A1.

An alternative to improve the adhesion of an ink film to the substrate is via the use of a binder resin. The binder resin can interact with the substrate and form a stronger bond with the substrate, which can help improve the ink adhesion, and consequently, the resistance to abrasion. In addition, the mechanical properties of the polymeric binder resin influences the abrasion resistance of the ink film, as well. For example, glass transition temperature ($T_g$) and molecular weight of the polymer affect its mechanical properties.

Prior solutions for improving ink durability, especially abrasion resistance, have been discussed above. One solution discussed was the use of corona treatment. This treatment, though very effective under certain circumstances, is generally not appropriate for high-speed applications, such as in industrial applications that require a high throughput, such as in the presently disclosed application.

The use of resins in ink formulations was also discussed above. Resins have been reported as an additive to improve the durability of printed inks on media. The ink formulations reported to contain resins are usually highly viscous solutions (higher than 10 centipoise seconds (cPs)). Such formulations are not compatible with thermal ink jet technology due to the fluidic limitations imposed by that technology. Solvent-based inks containing resins are, however, well known in the art of Continuous Inkjet (CIJ) and Piezoelectric Inkjet (PIJ) technologies. Such inks used in CIJ and PIJ usually have a viscosity of approximately 10-14 cPs and are therefore not compatible with thermal inkjet. Under most circumstances, thermal inkjet can effectively operate with fluids having a viscosity in the range of 1 to 4 cPs. Hence the resin-containing solvent-based inks used in CIJ or PIJ are inappropriate for thermal inkjet.

Binder resins have also been reported in thermal inkjet systems. Such resins have been used in underprinting or overprinting fluids which are printed separately in time and underneath or over the top of water-based ink images. The binder resin in the underprinting or overprinting fluid interacts with the colorant in the ink that is applied separately. TIJ inks have also been reported that contain binder resins in the ink itself. The overall effect is to bind the ink colorant not only to the polymer resin but to the substrate. Most binder resins are however substantially incompatible with a water-based ink and thus are not an actual component of the ink but are contained in a separate fluid.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components.

DETAILED DESCRIPTION

Figure 1:
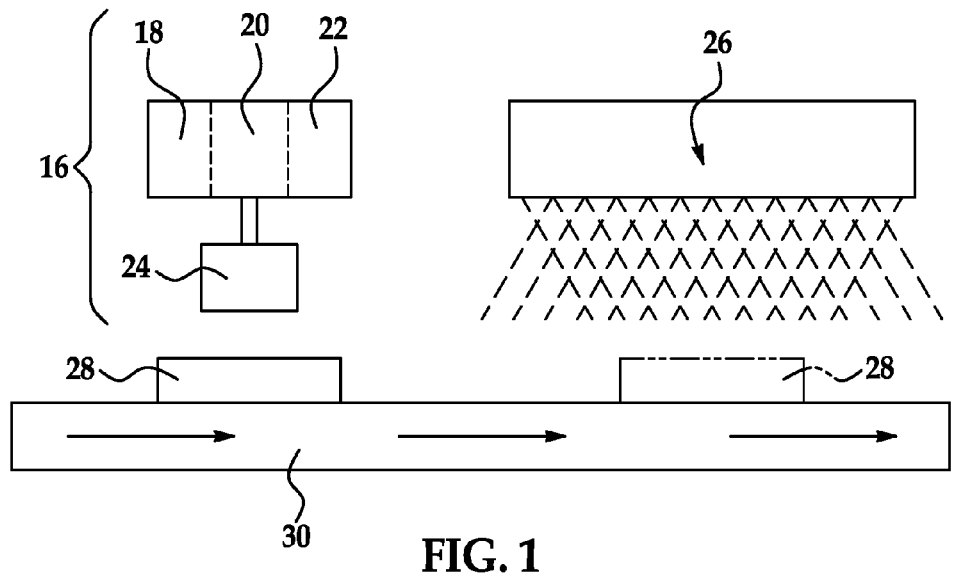
FIG. 1 is a schematic drawing of an embodiment of the printer/dryer system described herein.

The present inventors have found a need for a thermal inkjet ink that meets the demands of the industrial segment. Specifically, this ink should work well in high speed printing, have good print quality, be fast drying, and have improved durability and abrasion resistance.

As such, the present inventors disclose herein a fast drying inkjet ink technology based on a drop-on-demand (DOD) fluid dispenser, such as, in a non-limiting example, a thermal inkjet (TIJ) dispenser or a piezoelectric inkjet (PIJ) dispenser, as opposed to non-drop-on-demand systems such as continuous inkjet (CIJ). Such drop-on-demand systems dispense inks having formulations including organic solvents and only a negligible amount of water. The water content in the presently described ink is absorbed by the solvent during bottling or storage and is considered not to exceed 5% by weight. The ink composition disclosed herein is substantially composed of a base solvent, a propellant, a decap additive, a surfactant, a polymeric binder resin and a solvent-compatible colorant.

Embodiments of the solvent-based ink composition disclosed herein offer improved image durability on an overcoated substrate (e.g., aqueous NiCoat high gloss media and UV gloss media). As described above, the ink composition includes the following components: a smaller chain alcohol as base solvent (ethanol), a ketone (acetone) as a propellant, a longer chain alcohol (1-butanol) as a decap additive, and a binder resin. The binder resin includes but is not limited to any of the following types: styrene/acrylic (Joncryl® from BASF) and/or styrene/anhydride maleic acid (SMA® from Sartomer) among others.

One primary advantage of the presently disclosed ink is related to the effect of the binder resin on the durability properties and abrasion resistance of the printed image on overcoated media, such as semi-porous or porous paper. It has been found that the inclusion of the binder resin in solvent-based ink formulations significantly improves durability of the printed ink. The data discussed herein comparing binder resin-containing ink to a control ink suggests that the control ink (i.e., the one that did not contain a binder resin) was more susceptible to abrasion than the ink containing the resin additive.

Suitable base solvents for use with the presently disclosed ink composition include, but are not limited to, ethanol, n-propanol, 2-propanol, 1-butanol, etc. The selection of the base solvents is conducted by evaluating the following thermo-physical properties: heat of vaporization (delta $H_{vap}$), boiling point and vapor pressure. Components with a heat of vaporization and boiling temperature closer to the value of water (40.65 kJoules/mole) have been found to jet properly from a thermal inkjet printhead. Generally, solvents having a heat of vaporization between 30 and 52 kJoules/mole have appropriate jetting qualities from a thermal inkjet printhead. In the case of some components which do not offer adequate jettability alone, it has been found that the addition of a propellant with both low heat of vaporization and low boiling point adjusted the thermophysical properties of the solvent so that the resultant mixture of base solvent and propellant became jettable with thermal inkjet.

Solvents such as linear esters (ethyl-, butyl-acetates), and ketones (acetone and methyl ethyl ketone) have been found to be incompatible with the thermal inkjet printhead materials being used herein, in particular, when such solvents are used in proportions exceeding 40% by weight. When such solvents are used as propellants, no such incompatibility problems arose, since propellants are usually present in the ink at no more than 25 weight %.

Lower aliphatic chain alcohols, such as ethanol, 2-propanol, n-propanol and 1-butanol, show optimum jettability performance in the present fast drying inkjet inks. They have thus been selected, among others, as possible base solvents for the inks.

Additives to control decap are selected from components having a low to moderate vapor pressure (1-5 mm Hg at 25° C.) and a boiling point higher than the selected base solvent. Possible candidates for decap additives include: 1-methoxy-2-propanol, ethyl lactate, tert-butanol, tert-butyl acetate and 1-butanol. A low to moderate vapor pressure ensures that the decap additives are quickly removed from the printed ink, while maintaining a wet environment in the firing chamber area.

The term "decap control," as referred to herein, means the ability of the inkjet ink to readily eject from the print head, upon prolonged exposure to air. The ink decap time is measured as the amount of time that an inkjet printhead may be left uncapped before the printer nozzles no longer fire properly, potentially because of clogging or plugging. Generally, nozzle(s) may become clogged (i.e., impeded, slowed) or plugged (i.e., obstructed, substantially or completely closed) by a viscous plug that forms in the nozzle(s) as a result of solvent loss, crusting of the ink, and/or crystallization of the dye in and/or around any of the nozzles. If a nozzle has clogged, ink droplets ejected through the nozzle's orifice may be misdirected, which may adversely affect print quality. When an orifice is plugged, it becomes substantially or completely blocked. As a result of the nozzle being plugged, the ink droplets may not pass through the affected nozzle. Thus, the criteria for measuring failure to fire by a nozzle is that there is a misdirection of ink through the nozzle's orifice to a lesser or greater degree, or a complete blockage, which can be precisely indicated in a printed image on media printed by the nozzle.

The clogging and plugging effect on nozzles and their ink printing performance can be tested by various methods. In its simplest form, one method involves printing a given test pattern with the printhead nozzles to verify their working condition. This is followed by exposing the nozzles to the air for a fixed time without printing or spitting the nozzles. Then, all of the nozzles are printed again in the given test pattern for the second time. The test patterns are then compared to determine the number of weak or misdirected nozzles. In the worst case, such nozzle clogging or plugging results in a complete failure to fire by the nozzle.

As previously mentioned, suitable base solvents for use with the presently disclosed ink composition include, but are not limited to, ethanol, n-propanol, 2-propanol, 1-butanol, etc. The selection of the base solvents was conducted by evaluating the following thermo-physical properties: heat of vaporization (delta $H_{vap}$), boiling point and vapor pressure. Components with a heat of vaporization and boiling temperature closer to the value of water (40.65 kJoules/mole) were found to jet properly from a thermal inkjet printhead. Generally solvents having a heat of vaporization between 30 and 52 kJoules/mole had appropriate jetting qualities from a thermal inkjet printhead. It was found in the case of some components that they did not offer adequate jettability taken alone.

However, when a propellant with both low heat of vaporization and low boiling point was added to the solvent, this adjusted the thermophysical properties of the solvent. Non-limiting examples of such propellants include the following taken either individually or in combination: acetone, methyl ethyl ketone, ethyl acetate, or butyl acetate. The resultant mixture of base solvent and propellant became jettable with thermal inkjet.

Such propellants as linear esters (ethyl-, butyl-acetates), and ketones (e.g., acetone and methyl ethyl ketone), given as non-limiting examples above, have, under certain conditions, been found to interact with the thermal inkjet printhead materials of a limited number of some older model inkjet printers. Since such interaction and breakdown only occur for such printers when the propellants are used in the ink in proportions exceeding 40 weight %, such propellants are usually present in the ink at no more than 25 weight %. Therefore, such incompatibility problems no longer occur in any of the inkjet printhead materials tested when the ink has no more than 25 weight % propellant. In addition to the propellants, the ink also has a base solvent. The base solvent is usually present in the ink in at least 40 weight %. As mentioned hereinabove, lower aliphatic chain alcohols such as ethanol, 2-propanol, n-propanol and 1-butanol show optimum jettability performance in the present fast drying inkjet inks. They are thus selected, among others, as possible base solvents for the inks. When propellants are present at a percentage ranging between 15 and 25 weight % along with the base solvents, the inks show good effectiveness in drop-on-demand printing.

Also as previously mentioned, additives to control decap were selected from components having a low to moderate vapor pressure (1-5 mm Hg at 25° C.) and a boiling point higher than the base solvent. Non-limiting examples of good decap-controlling additives include (among others): 1-methoxy-2-propanol, ethyl lactate, tert-butanol, tert-butyl acetate and 1-butanol. A low to moderate vapor pressure ensures that the decap-controlling additives are quickly removed from the printed ink, while maintaining a wet environment in the firing chamber area.

Fast removal by evaporation of the non-ink components of the printed ink ensures that drop coalescence is minimized. Thus, a more uniform ink coverage is obtained particularly for low surface energy substrates (25 mN/m² or less). If the base solvents/additive system is not removed quickly, the resultant printed image will show poor print quality due to a poor area fill. Surfactants are added to the ink formulations to improve wetting properties and to control the surface tension gradients that result from the evaporation of the organic solvents. As surfactants, silicones (such as, for example, Silwet L7200, Silwet L7220 and Dow Corning 67) and fluorosurfactants (such as, for example, (Novec FC4430, Novec FC4432 and Zonyl FSO) have been found to be compatible with organic systems such as those described for the presently disclosed inkjet inks.

A polymeric binder resin may be added to the ink formulation to improve durability of the printed ink. In a non-limiting example, the binder resins are selected from the group consisting of styrene/acrylic acid copolymers, styrene/maleic anhydride copolymers, and combinations thereof.

Suitable colorants compatible with the organic systems include solvent dyes, which may be obtained in their solid (powder) form or dissolved in an organic solvent, such as n-propanol or a glycol ether mixture. N-propanol liquid dyes are the preferred solutions for the presently disclosed ink. Commercially available dyes sold in the liquid form in n-propanol base include Morfast K 101 and Morfast K DC manufactured by Sunbelt Corporation.

The above-described ink components in the presently disclosed ink compositions offered a drying time less than 5 seconds in non-absorbent media, such as polypropylene packaging tape, as well as varnished and overcoated substrates (e.g., UV gloss, Aqueous Ni Coat Hi gloss, and others), and as well as other polymeric films, such as polystyrene (PS), polyethylene terephthalate (PET), polypropylene (PP), and others.

In addition, solvent removal of the printed ink may be accelerated by means of in-line air drying, for example, by using axial cooling fans positioned in the high speed printer immediately following the printing engine. The inclusion of the in-line air drying systems allows inks to be used that might otherwise not dry fast enough. The drying tunnel provides optimum conditions for evaporation of ink solvents. The drying systems also maximize positive results with effects related to decap, recovery and coalescence control.

Overall, the presently described inks reflect the combination of current thermal inkjet technology with organic based ink compositions composed of fast evaporating components. These ink compositions offer consistent pen performance and bring long term compatibility with thermal inkjet printhead materials. The presently described ink compositions provide fast drying (less than 5 seconds) on non-absorbent substrates. They also offer good print quality and adequate decap control performance and long term inkjet printhead recovery. Additionally, the inclusion of the solvent dyes brings the advantage of improved waterfastness due to the low solubility in water of the dyes. The incorporation of in-line air drying via axial cooling fans was shown to accelerate solvent removal and decrease drying time.

FIG. 1 depicts an inkjet fluid dispensing device as well as an air dryer for causing fast evaporation of the printed ink on the medium. The inkjet fluid dispensing devices used for the present disclosure is a thermal inkjet (TIJ) or piezoelectric inkjet (PIJ) device. Such devices include at least one fluid reservoir 18. By way of example, multiple reservoirs 20 and 22 can also be provided in the fluid dispenser 16. Each reservoir 18, 20, 22 may contain the same or different fluids. Alternatively, a single reservoir can contain a plurality of separate compartments. Such fluid dispenser 16 includes at least one fluid drop generator or inkjet printhead for each reservoir 18, 20 and 22. Preferably, an array 24 is provided with a plurality of heads or droplet generators divided into subgroups, with each subgroup containing a plurality of heads associated with one specific reservoir 18, 20 or 22. The fluid dispenser 16 is a drop-on-demand type fluid dispenser with a thermal fluid drop.

Also depicted along with the fluid dispenser 16 in FIG. 1 is a drying tunnel 26 by which the liquid in the ink printed by the fluid dispenser 16 is quickly evaporated off of the printed medium 28. The printed medium 28 moves through the drying tunnel 26 by means of a conveyor 30. As shown in FIG. 1, the drying tunnel 26 extends along the conveyor 30 from the fluid dispenser 16. After passing through the tunnel 26, the liquid in the ink printed onto the medium 28 is substantially or completely evaporated. In an example, the drying tunnel 26 maintains the medium 28 at a temperature which approximates ambient or room temperature. In a non-limiting example, the evaporating of the liquid in the printed ink can be facilitated with fans (not shown) positioned along the drying tunnel 26. In another non-limiting example, the drying tunnel 26 extends from approximately 20 to 40 inches in length from where the medium 28 enters the tunnel 26 to where it exits the tunnel 26.

To further illustrate embodiment(s) of the present disclosure, examples are given herein. It is to be understood that these examples are provided for illustrative purposes and are not to be construed as limiting the scope of the disclosed embodiment(s).

EXAMPLES

Example 1

Ink compositions were made according to the present application. The inks included ethanol as the base solvent; acetone as the propellant; n-butyl alcohol as the decap additive; a blend of solvent dyes available in an n-propanol base as the colorant; and one of the following binder resins respectively:

SMA®01440F: a flake form of a partial mono ester of a styrene maleic anhydride with acid number 185, $T_g$ 60 and MW 7000;

SMA®017352P: a powder form of a partial mono ester of a styrene maleic anhydride with acid number 270, $T_g$ 125 and MW 7000;

SMA®3840F: a flake form of a partial mono ester of a styrene maleic anhydride with acid number 110, $T_g$ 75 and MW 10,500;

SMA®1000I: a copolymer of styrene and dimethylaminopropylamine (DMAPA) maleimide with an approximate 1:1 mole ratio, with acid number less than 1, $T_g$ 85 and MW range from 5000-10000;

SMA®2000I: a copolymer of styrene and dimethylaminopropylamine (DMAPA) maleimide with an approximate 2:1 mole ratio, with acid number less than 1, $T_g$ 88 and MW range from 5000-10000;

SMA®3000I: a copolymer of styrene and dimethylaminopropylamine (DMAPA) maleimide with an approximate 3:1 mole ratio, with acid number less than 1, $T_g$ 90 and MW range from 5000-10000;

Joncryl® HPD 671: a copolymer of styrene and acrylic acid, with acid number 214, $T_g$ 128 and MW 17250;

Joncryl® 680: a copolymer of styrene and acrylic acid, with acid number 215, $T_g$ 67 and MW 4900; and Joncryl® 683: a copolymer of styrene and acrylic acid, with acid number 165, $T_g$ 75 and MW 8000.

The resin was first dissolved in the acetone and then added to the base solvent. This was followed by the addition of the additives and solvent dyes blend. The mixture was stirred until homogeneous. The amounts of the components are set forth in Table 1 below.

TABLE 1

| Component | % (w/w) |
|---|---|
| Ethanol | 75.95% |
| Acetone | 8.11% |
| 1-Butanol | 5.41% |
| n-Propanol | 3.81% |
| Solvent Brown 52 | 4.47% |
| Solvent Violet 9 | 0.38% |
| Dodecylbenzene Sulfonic Acid (DBSA) | 0.79% |
| Binder Resin | 1.08% |

Example 2

Separate black ink samples were made according to Example 1, each ink sample including one of the resins listed in Example 1, respectively. An ink sample lacking binder resin and including an ethanol vehicle to fill in the volume of the missing binder resin was used as a control. The printheads were used with a high-speed printer, equipped with a conveyor capable of running to 250 ft/min. The high speed printer had the capability of running up to three printheads simultaneously. The high speed printer had a drying tunnel, composed of two axial flow cooling fans to aid in the solvent removal after the printing process. For the resin study, the high speed printer was operated at 20 inches/second, at a resolution of 300×300 dpi. The printed image was air-assisted by means of axial flow fans for a period of 1 second, immediately after the printing process.

Figure 2:
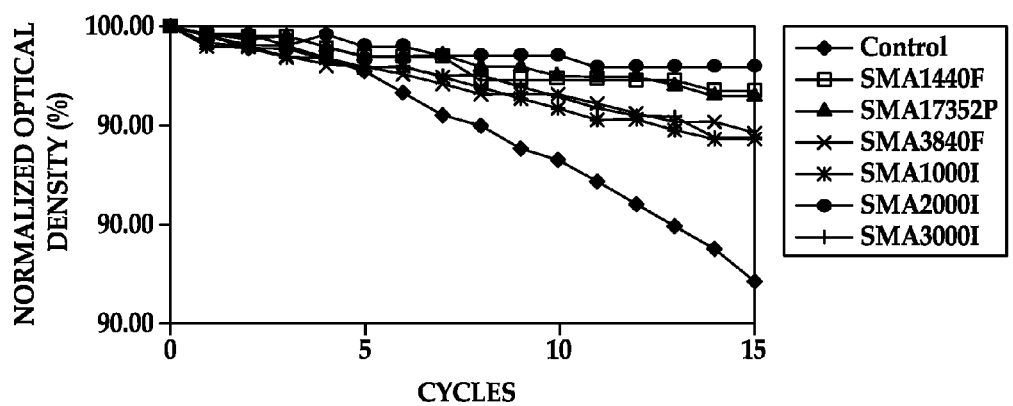
FIG. 2 is a plot of optical density as a function of abrasion cycles based on data described herein.

The various ink and control samples were printed on Aqueous NiCoat Hi Gloss media. The samples were allowed to dry overnight and were submitted for abrasion testing. The method for abrading was with the Taber linear abraser. The abrasion test was conducted with a crock meter kit (diameter ¼ inches). The printed image was positioned at a distance of 3 inches from the abradant prior to starting the testing. The instrument was operated at a speed of 40 cycles/minute with a force equivalent to 250 grams. The abrasion or print damage was quantitated by measuring the optical density (OD) of a dense block after each abrasion cycle. A plot of normalized optical density (%) as a function of abrasion cycles was generated for ink samples including respectively: SMA®1440F, SMA®17352P, SMA®3840F, SMA®1000I, SMA®2000I, SMA®3000I and control, and the profile is shown in FIG. 2. The key in the box to the right of FIG. 2 shows each symbol represented in FIG. 2 next to the name of the specific binder resin (and control) to which each symbol corresponds. The data as represented in FIG. 2 revealed a significant improvement in abrasion resistance with those inks containing the SMA® resins (1.08 wt. % resin) when compared to those inks not containing resin.

Example 3

Two separate black ink samples were made according to Example 1, the ink samples including 1.08 or 0.54 weight percent SMA®17352P respectively. Two ink samples lacking binder resin and including an ethanol vehicle to fill in the volume of the missing binder resin were used as controls. The ink and control samples were printed on Aqueous NiCoat Hi Gloss media. The given samples were printed and tested as described in Example 2.

Figure 3:
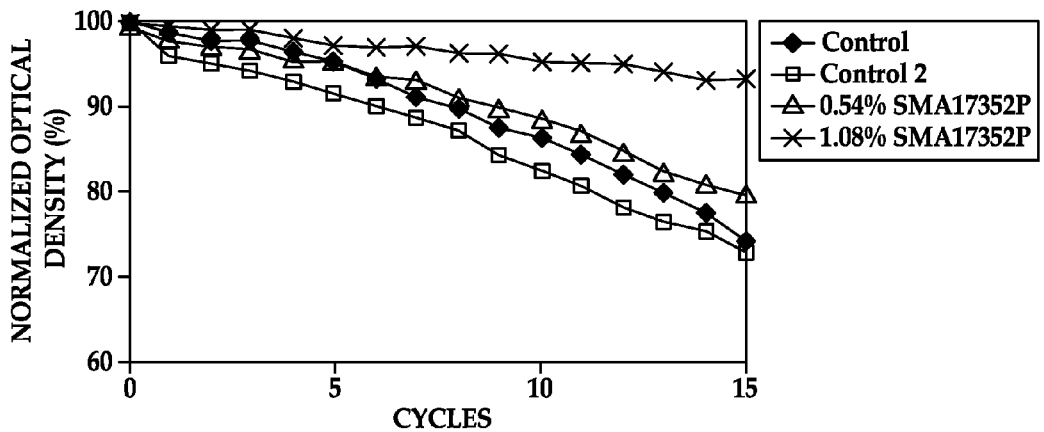
FIG. 3 is a plot of optical density as a function of abrasion cycles based on data described herein.

A plot of normalized optical density (%) as a function of abrasion cycles was generated for ink samples including respectively: 1.08% and 0.54% SMA®17352P, and the two control ink samples. The profile is shown in FIG. 3. The key in the box to the right of FIG. 3 shows each symbol represented in FIG. 3 next to the name of the specific binder resin (and control) to which each symbol corresponds. The data as represented in FIG. 3 revealed a noticeable difference in abrasion resistance with the ink containing the 1.08 weight percent SMA®17352P over the ink containing the 0.54 weight percent SMA®0173520.

Example 4

Four separate black ink samples were made according to Example 1, the ink samples including 3.24, 2.16, 1.08 or 0.54 weight percent SMA®2000I respectively. Two ink samples lacking binder resin and including an ethanol vehicle to fill in the volume of the missing binder resin were used as controls. The ink and control samples were printed on Aqueous NiCoat Hi Gloss media. The given samples were printed and tested as described in Example 2.

Figure 4:
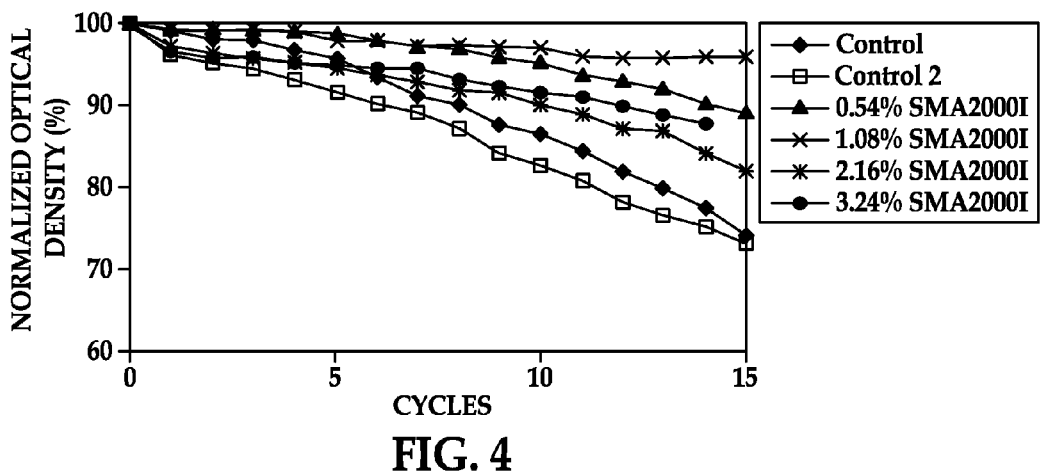
FIG. 4 is a plot of optical density as a function of abrasion cycles based on data described herein.

A plot of normalized optical density (%) as a function of abrasion cycles was generated for ink samples including respectively: 3.24, 2.16, 1.08 or 0.54 weight percent SMA®2000I, as well as for the two control ink samples. The profile is shown in FIG. 4. The key in the box to the right of FIG. 4 shows each symbol represented in FIG. 4 next to the name of the specific binder resin (and control) which each symbol corresponds. The data as represented in FIG. 4 revealed a noticeable difference in abrasion resistance with the ink containing the 1.08 weight percent SMA®17352P over the other inks.

Example 5

Five separate black ink samples were made according to Example 1, the ink samples including 1.08 weight percent Joncryl HPD 671, Joncryl 680, Joncryl 663, SMA® 1440F and SMA® 3840F, respectively. One ink sample lacking binder resin and including an ethanol vehicle to fill in the volume of the missing binder resin was used as a control. The ink and control samples were printed on Aqueous NiCoat Hi Gloss media. The given samples were printed and tested as described in Example 2.

Figure 5:
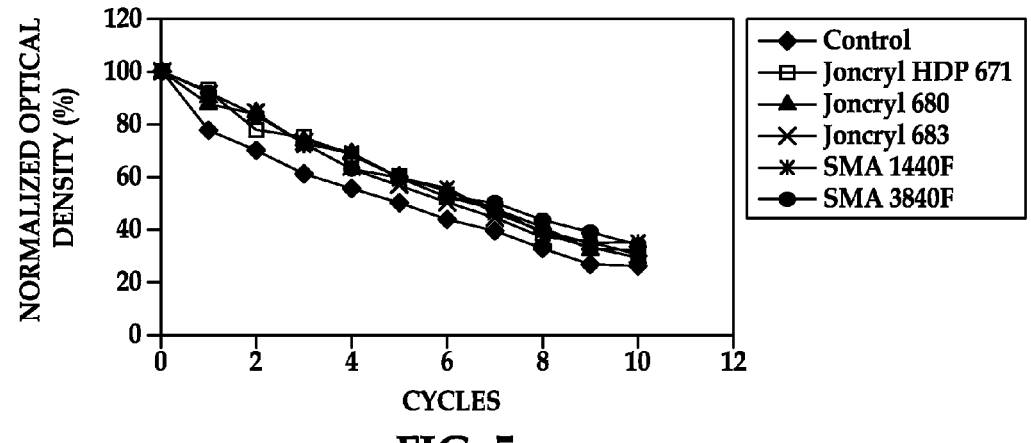
FIG. 5 is a plot of optical density as a function of abrasion cycles based on data described herein.

A plot of normalized optical density as a function of abrasion cycles was generated for ink samples including respectively: 1.08 weight percent Joncryl HPD 671, Joncryl 680, Joncryl 663, SMA® 1440F and SMA® 3840F, and the control ink sample. The profile is shown in FIG. 5. The key in the box to the right of FIG. 5 shows each symbol represented in FIG. 5 next to the name of the specific binder resin (and control) to which each symbol corresponds.

Example 6

A black ink sample was made according to Example 1, the ink sample including 1.08 weight percent SMA® 1440F. One ink sample lacking binder resin and including an ethanol vehicle to fill in the volume of the missing binder resin was used as a control. The ink and control samples were printed on UV Gloss media. The given samples were printed and tested as described in Example 2.

Figure 6:
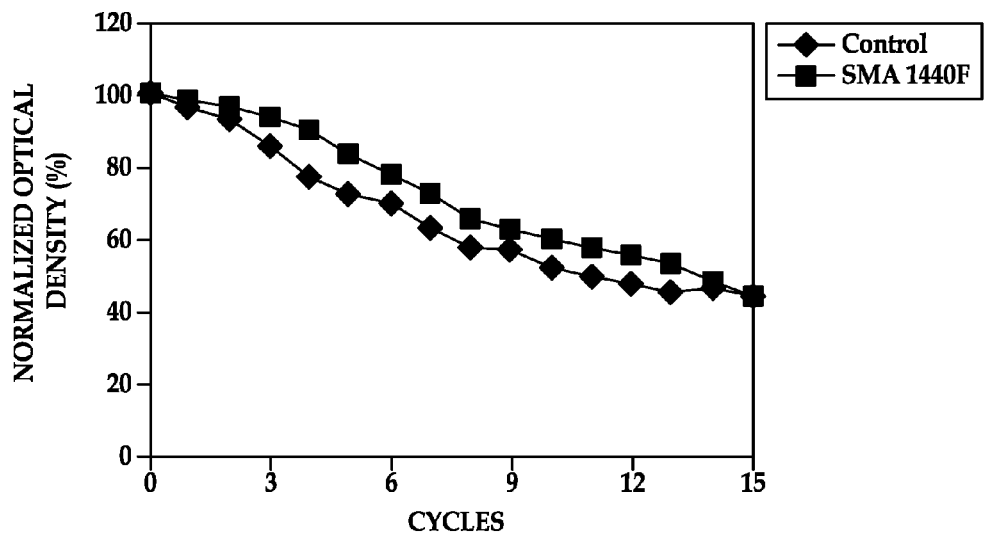
FIG. 6 is a plot of optical density as a function of abrasion cycles based on data described herein.

A plot of normalized optical density as a function of abrasion cycles was generated for ink samples including respectively: 1.08 weight percent SMA® 1440F and SMA® 3840F, as well as the control ink sample. The profile is shown in FIG. 6. The key in the box to the right of FIG. 6 shows each symbol represented in FIG. 5 next to the name of the specific binder resin (and control) to which each symbol corresponds. The data as represented in FIG. 6 revealed a noticeable difference in abrasion resistance with ink containing the SMA® 1440F resin in comparison to the control ink.

Example 7

Six separate black ink samples were made according to Example 1, the ink samples including 1.08 weight percent SMA®1440F, SMA®17352P, SMA®3840F, SMA®1000I, SMA®2000I and SMA®3000I, respectively. One ink sample lacking binder resin and including an ethanol vehicle to fill in the volume of the missing binder resin was used as a control. The ink and control samples were printed on Aqueous NiCoat Hi gloss media. The given samples were printed and tested as described in Example 2.

Figure 7:
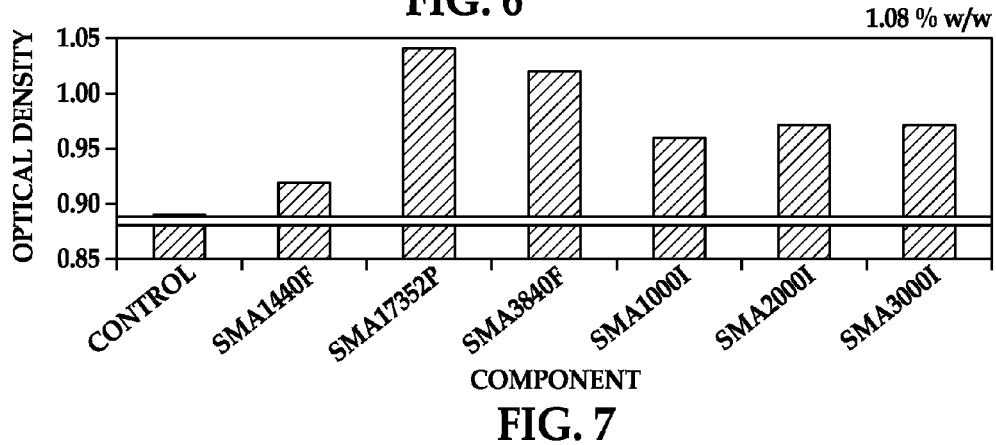
FIG. 7 is a bar graph of optical density based on data described herein.

A bar graph of optical density was generated to compare ink samples including respectively: 1.08 weight percent SMA®1440F, SMA®17352P, SMA®3840F, SMA®1000I, SMA®2000I and SMA®3000I, along with the control ink sample. The bar graph profile is shown in FIG. 7. The data revealed that all of the inks with the respective SMA® resins had noticeably better optical density on Aq NiCoat Hi Gloss Media than the control ink.

Example 8

Six separate black ink samples were made according to Example 1, the ink samples including 1.08 weight SMA®1440F, SMA®17352P, SMA®3840F, SMA®1000I, SMA®2000I and SMA®3000I respectively. One ink sample lacking binder resin and including an ethanol vehicle to fill in the volume of the missing binder resin was used as a control. The ink and control samples were printed on UV Gloss media. The given samples were printed and tested as described in Example 2.

Figure 8:
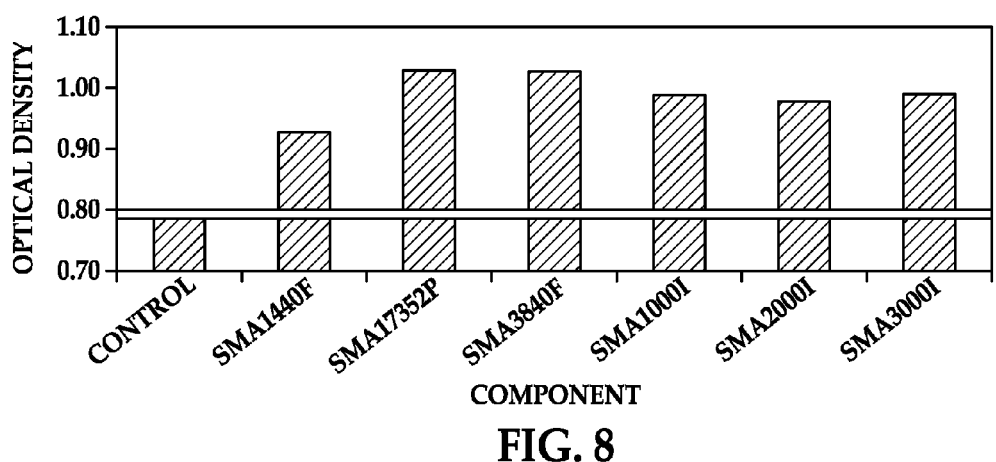
FIG. 8 is a bar graph of optical density based on data described herein.

A bar graph of optical density was generated to compare to ink samples including respectively: 1.08 weight SMA®1440F, SMA®17352P, SMA®3840F, SMA®1000I, SMA®2000I and SMA®3000I, and the control ink sample. The bar graph profile is shown in FIG. 8. The data revealed that all of inks with the respective SMA® resins had noticeably better optical density on UV Gloss Media than the control ink.

While several embodiments have been described in detail, it will be apparent to those skilled in the art that the disclosed embodiments may be modified. Therefore, the foregoing description is to be considered exemplary rather than limiting.

What is claimed is:

1. A fast drying solvent-based inkjet ink composition for inkjet printing, the ink composition comprising at least 40 weight percent base solvent, a solvent-compatible colorant, propellant, a decap-controlling additive, from 0.5 weight % to 3.5 weight % of a binder resin and not more than 5 weight percent water;
wherein the propellant is compatible with inkjet printhead materials in a concentration at most 25 weight % of the ink composition.

2. The ink composition of claim 1, wherein the ink composition is for thermal inkjet printing.

3. The ink composition of claim 1, wherein the binder resin is selected from the group consisting of styrene/acrylic acid, styrene/maleic anhydride copolymers, and combinations thereof.

4. The ink composition of claim 1, wherein the base solvent and propellant have a heat of vaporization from 30 to 52 kJoules/mole.

5. The ink composition of claim 1, wherein the base solvent is selected from the group consisting of ethanol, n-propanol, 2-propanol, 1-butanol, and combinations thereof.

6. The ink composition of claim 1, wherein the propellant is selected from the group consisting of acetone, methyl ethyl ketone, ethyl acetate, butyl acetate and combinations thereof, and wherein the propellant is from 15% to 25% by weight of the ink composition.

7. The ink composition of claim 1, wherein the decap-controlling additive has a vapor pressure from 1 to 5 mm Hg at 25° C. and has a boiling point greater than the base solvent.

8. The ink composition of claim 1, wherein the decap-controlling additive is selected from the group consisting of 1-methoxy-2-propanol, ethyl lactate, tert-butanol, tert-butyl acetate, 1-butanol and combinations thereof.

9. The ink composition of claim 1, wherein the ink composition further comprises a surfactant compatible with organic systems.

10. The ink composition of claim 9, wherein the surfactant is selected from the group consisting of silicones and fluorosurfactants.

11. The ink composition of claim 1, wherein the colorants are solvent dyes.

12. A method of printing a fast-drying solvent-based inkjet ink with the ink composition including at least 40 weight percent base solvent, a solvent-compatible colorant, at most 25 weight percent propellant, a decap-controlling additive, from 0.5 weight % to 3.5 weight % of a binder resin and not more than 5 weight percent water; the method comprising the step of activating an inkjet printhead to eject the inkjet ink.

13. The method of claim 12, further comprising establishing fluid communication between the inkjet printhead and an ink supply container through a fluid conduit.

14. The method of claim 12, further comprising an ink reservoir integrally formed in an inkjet cartridge, the ink reservoir in fluid communication with the inkjet printhead.

15. A system for inkjet printing and fast drying an image on non-absorbent media, the system comprising:
at least one drop on demand inkjet printhead having a fluid ejector configured for dropwise ejecting ink drops onto a non-absorbent media, the printhead fluidically coupled with an ink source, wherein the ink source includes:
an ink composition comprising at least 40 weight percent base solvent, a solvent-compatible colorant, at most 25 weight percent propellant, a decap additive, from 0.5 weight % to 3.5 weight % of a binder resin, and at most 5 weight % water; and
a drying system attached to the system for inkjet printing.

16. The system of claim 15, wherein the base solvent and propellant have a heat of vaporization from 30 to 52 kJoules/mole.

17. The system of claim 15, wherein the base solvent is selected from the group consisting of ethanol, n-propanol, 2-propanol, 1-butanol, acetone and combinations thereof; the propellant is selected from the group consisting of methyl ethyl ketone, ethyl acetate, butyl acetate and combinations thereof; and the binder resin is selected from the group consisting of styrene/acrylic acid, styrene/maleic anhydride copolymer and combinations thereof.

* * * * *

UNITED STATES PATENT AND TRADEMARK OFFICE
CERTIFICATE OF CORRECTION

PATENT NO.         : 8,087,766 B2                                    Page 1 of 1
APPLICATION NO.    : 13/122334
DATED              : January 3, 2012
INVENTOR(S)        : Marcos A. Barreto et al.

It is certified that error appears in the above-identified patent and that said Letters Patent is hereby corrected as shown below:

On the title page, in item (54) and column 1, line 1, Title, after "INKJET" insert -- INK --.

Signed and Sealed this
Twentieth Day of November, 2012

David J. Kappos
*Director of the United States Patent and Trademark Office*